United States Patent
Jin et al.

(10) Patent No.: US 12,359,392 B1
(45) Date of Patent: Jul. 15, 2025

(54) THERMOSYPHON FOUNDATION, METHOD OF CALCULATING COLD CONDUCTIVITY ENHANCEMENT COEFFICIENT AND METHOD OF COLD CONDUCTIVITY ENHANCEMENT THEREOF

(71) Applicant: CCCC FIRST HIGHWAY CONSULTANTS CO., LTD., Shaanxi Province (CN)

(72) Inventors: Long Jin, Shaanxi Province (CN); Yuanhong Dong, Shaanxi Province (CN); Binhua Hu, Shaanxi Province (CN); Jianbing Chen, Shaanxi Province (CN); Pan Chen, Shaanxi Province (CN); Jinbao Zhang, Shaanxi Province (CN); Liguo Zhao, Shaanxi Province (CN); Wansheng Pei, Shaanxi Province (CN); Xiaoliang Yao, Shaanxi Province (CN)

(73) Assignee: CCCC FIRST HIGHWAY CONSULTANTS CO., LTD., Shaanxi Province (CN)

( * ) Notice: Subject to any disclaimer, the term of this patent is extended or adjusted under 35 U.S.C. 154(b) by 0 days.

(21) Appl. No.: 18/936,150

(22) Filed: Nov. 4, 2024

(30) Foreign Application Priority Data

Feb. 23, 2024 (CN) .......................... 202410201352.7

(51) Int. Cl.
*E02D 31/00* (2006.01)
*E02D 33/00* (2006.01)
*G01V 9/00* (2006.01)

(52) U.S. Cl.
CPC ............. *E02D 31/00* (2013.01); *E02D 33/00* (2013.01); *G01V 9/005* (2013.01); *E02D 2300/0006* (2013.01); *E02D 2300/0023* (2013.01)

(58) Field of Classification Search
CPC . E02D 31/00; E02D 33/00; E02D 2300/0006; E02D 2300/0023; G01V 9/005
See application file for complete search history.

(56) References Cited

U.S. PATENT DOCUMENTS

| 2023/0321772 A1 | 10/2023 | Saygan et al. |
| 2023/0367919 A1 | 11/2023 | Hu et al. |

FOREIGN PATENT DOCUMENTS

| CN | 105544512 A | 5/2016 |
| CN | 106120506 A | 11/2016 |

(Continued)

OTHER PUBLICATIONS

Zhou et al. Numerical Modeling and Cooling Performance Evaluation of a Pressure-Driven Two-Phase Closed Thermosyphon With a Long Horizontal Evaporator Renewable Energy 222, Dec. 19, 2023 (Year: 2023).*

(Continued)

*Primary Examiner* — Rehana Perveen
*Assistant Examiner* — Cuong V Luu
(74) *Attorney, Agent, or Firm* — CKC & Partners Co., LLC

(57) ABSTRACT

The invention provides a thermosyphon foundation, a method of calculating cold conductivity enhancement coefficient and a method of cold conductivity enhancement thereof. The cold conductivity enhancement coefficient is obtained by using parameters including freezing index, latent heat of soil thawing, thermal resistance of pre-buried hole without injection of a cold conductivity enhancement medium, thermal resistance of cold conductivity enhancement mass or the like, and by using formulas for calculating the cooling radius of the thermosyphon without injection of a cold conductivity enhancement medium and the cooling radius of the thermosyphon after injection of a cold conductivity enhancement medium. The invention determines (Continued)

whether to proceed with subsequent construction by using the cold conductivity enhancement coefficient, and achieves cold conductivity enhancement for the thermosyphon foundation by using the method of cold conductivity enhancement.

4 Claims, 3 Drawing Sheets

(56) References Cited

FOREIGN PATENT DOCUMENTS

| CN | 109235185 A | 1/2019 |
|---|---|---|
| CN | 209099108 U | 7/2019 |
| CN | 110502847 A | 11/2019 |
| CN | 116204967 A | 6/2023 |
| KR | 100778936 B1 | 11/2007 |
| KR | 20230119285 A | 8/2023 |
| RU | 2012117487 A | 11/2013 |

OTHER PUBLICATIONS

Pei et al. Geotemperature Control Performance of Two-Phase Closed Thermosyphons in the Shady and Sunny Slops of an Embankment in a Permafrost Region Applied Thermal Engineering 112, pp. 986-998, 2017 (Year: 2017).*

Hakon Alfret Suitability of Thermosyphon as a Ground Freezing Technology in Longyearbyen, Master's thesis in Geotechnology Norwegian University of Science and Technology, Jun. 2022 (Year: 2022).*

Xiao, Rongjiu, "Science of Engineering Rock and Soil", Shanxi Normal University Publishing House, Sep. 30, 1992, p. 133-134.

Zhang, Lei et al., "Mechanism analysis and construction technology of thermosiphon-based protection for railway bed through permafrost region", Water Resources and Hydropower Engineering, vol. 36, No. 8, Jun. 6, 2005, p. 17-19.

Xie, Ming et al., "Thermosyphon technology for permafrost foundation design, Thermosyphon technology for the design of permafrost foundations", Heilongjiang Power technology, vol. 15, No. 3, Jun. 30, 1992, p. 189-191.

Chen, Ji, et al., "Discussion on Cooling Radius of Heat Piles in Permafrost Area", Journal of Catastrophology, vol. 34, S1, Nov. 20, 2019, p. 220-223.

Yang, Yongping et al., "Thermosyphon technology and its application in permafrost", Chinese Journal of Geotechnical Engineering, vol. 27, No. 6, Jun. 20, 2005, p. 698-706.

Chen, Ji et al., "Observation and Study of Cooling Radius of Heat Pipes in Swampy Permafrost Regions along Qaidar-Muli Railway", Journal of Glaciology and Geocryology, vol. 33, No. 4, Aug. 15, 2011, p. 897-901.

Tao, Hanzhong et al., "Analysis and calculation of reinforced structural foundation in frozen areas with thermosyphon", Chinese Journal of Geotechnical Engineering, vol. 27, No. 8, Aug. 31, 2005, p. 881-884.

Chen, Yongjie, "Construction technology of deep foundation pitsupport for filling soil foundation", Shanxi Architecture, vol. 47, No. 14, Jul. 31, 2021, p. 54-57.

Zhang, Xiaofan, "The Experimental Research and Numerical Simulation of Foam Concrete Water Absorption and Cooling Performance", Tsinghua University (People's Republic of China), May 31, 2023.

* cited by examiner

THERMOSYPHON FOUNDATION, METHOD OF CALCULATING COLD CONDUCTIVITY ENHANCEMENT COEFFICIENT AND METHOD OF COLD CONDUCTIVITY ENHANCEMENT THEREOF

CROSS-REFERENCE TO RELATED APPLICATIONS

This non-provisional application claims priority under 35 U.S.C. § 119(a) to patent application 202410201352.7 filed in P.R. China on Feb. 23, 2024, the entire contents of which are hereby incorporated by reference.

Some references, if any, which may include patents, patent applications and various publications, may be cited and discussed in the description of this application. The citation and/or discussion of such references, if any, is provided merely to clarify the description of this application and is not an admission that any such reference is "prior art" to the application described herein. All references listed, cited and/or discussed in this specification are incorporated herein by reference in their entirety and to the same extent as if each reference was individually incorporated by reference.

FIELD OF THE INVENTION

The invention relates to the technical field of foundation protection, in particular to a thermosyphon foundation, a method of calculating cold conductivity enhancement coefficient and a method of cold conductivity enhancement thereof.

BACKGROUND OF THE INVENTION

Thermosyphon technology (also known as "heat pipe technology") is a typical proactive cold conduction structure in civil engineering construction in permafrost areas, where thermosyphons are buried in the foundation, and when the temperature of the atmospheric environment is lower than the temperature underneath the foundation, the working medium inside the thermosyphon undergoes a gas-liquid phase transition, phase-change heat transfer and gravitational reflux to continuously transfer the heat from the foundation to the external environment, so that the temperature of the foundation is continuously lowered. This effectively lowers the ground temperature and prevents thermal thawing settlement of the permafrost foundation. The rated power of a single thermosyphon is more than 200 W, but actual monitoring reveals that the actual power is only about 50-60 W, with a working efficiency of less than 30% of the factory efficiency. The main factor contributing to this status quo is the construction process. In actual engineering construction, the drill and bury method is often employed. In this method, the drilling is carried out first, then the thermosyphon is inserted, and gravel is often used to backfill between the thermosyphon and the drilling hole. Due to the narrow gap around the thermosyphon, loose backfill material and difficulty in compacting the backfill, the contact between the thermosyphon and the foundation is poor after construction, which greatly weakens the cooling efficiency of the thermosyphon. In addition, atmospheric precipitation infiltrates more easily into the drilling hole, which accelerates the degradation of the permafrost foundation and induces the occurrence and development of various kinds of thermal thawing damage on the heat pipe foundation. Therefore, in order to fully realize the cooling efficiency of the thermosyphon, it is necessary to carry out anti-seepage and cold conductivity remediation for thermosyphon drilling.

The current Technical Specifications for Design and Construction of Thermosyphon Substructure for Highway in Permafrost Areas (T/CECS G: D21-03-2021) and Technical Specifications for Construction and Inspection of Special Subgrade for Highway in Permafrost Areas (Q/CCCC GL103-2020) have proposed a solution that involves backfilling with medium-coarse sand between the drilling hole and the thermosyphon and using the in-water sand settling method for construction. However, since the buried section of the thermosyphon exceeded 5 m, the gap between the thermosyphon and the drilling hole was only about 2 cm, and some of the thermosyphons were inserted at an inclined angle, it was difficult to backfill the gap and compact the material properly, resulting in poor post-construction performance. In addition, patent literature such as CN201811160504.4 describes a heat pipe subgrade for controlling seasonally frozen damage and a construction method thereof, and CN201821616935 describes a heat pipe subgrade for controlling seasonally frozen damage. Although these patent documents suggest a technical solution of filling fine sand between the thermosyphon and the thermosyphon mounting hole, they still suffer from the problems mentioned above and are unable to avoid the problems of poor backfilling performance and water seepage. In addition, the effectiveness calculation or evaluation of the difference in backfilling effect after the thermosyphon is mounted has not been made.

SUMMARY OF THE INVENTION

In order to solve the problems of the prior art, the technical solutions adopted in the invention are as follows.

One aspect of the invention provides a method of calculating cold conductivity enhancement coefficient for thermosyphon foundation, which comprises the steps of calculating the freezing index FI based on meteorological data;

based on geological parameters, calculating the latent heat of soil thawing $Q_L$, and calculating the thermal resistance $R_0$ of a pre-buried hole without injecting a cold conductivity enhancement medium, wherein the cold conductivity enhancement medium is used for filling the pre-buried hole to form a cold conductivity enhancement mass, as well as for filling a portion of the thermosyphon buried in the pre-buried hole;

calculating the thermal resistance $R_h$ of the cold conductivity enhancement mass based on the cold conductivity enhancement medium; and calculating the cooling radius $r_{f0}$ of the thermosyphon without injection of the cold conductivity enhancement medium by using Equation $$FI = Q_L \cdot \left[ \pi L(R_a + R_0) \cdot \left( r_{f0}^2 - \left(\frac{d}{2}\right)^2 \right) + \frac{r_{f0}^2}{4\lambda} \cdot \left( \ln\frac{2r_{f0}}{d} - 1 \right) + \frac{d^2}{16\lambda} \right],$$

and calculating the cooling radius $r_f$ of the thermosyphon after injection of the cold conductivity enhancement medium by using Equation $$FI = Q_L \cdot \left[ \pi L(R_a + R_h) \cdot \left( r_f^2 - \left(\frac{d}{2}\right)^2 \right) + \frac{r_f^2}{4\lambda} \cdot \left( \ln\frac{2r_f}{d} - 1 \right) + \frac{d^2}{16\lambda} \right],$$

where $R_a$ is the thermal resistance of the thermosyphon, $R_h$ is the thermal resistance of the cold conductivity enhancement mass, d is the diameter of the pre-buried hole, λ is the thermal conductivity coefficient of soil, and L is the latent heat of phase transition, and finally calculating the cold conductivity enhancement coefficient K by using Equation $$K = \frac{r_f}{r_{f0}}.$$

In a preferred embodiment of the invention, the meteorological data includes temperature, and the freezing index FI is calculated by using Equation $$FI = \int_{t1}^{t2} |T|dt,$$

is time, T is temperature, and T is less than 0° C.

In a preferred embodiment of the invention, the geological parameters include the dry density of soil $p_d$ and the water content w, and the latent heat of soil thawing $Q_L$ is calculated by using Equation $Q_L = L \cdot p_d \cdot w$.

In a preferred embodiment of the invention, the geological parameters include the initial thermal conductivity $\lambda_0$ of the pre-buried hole, and the thermal resistance $R_0$ of the pre-buried hole without injection of a cold conductivity enhancement medium is calculated by using Equation $$R_0 = \frac{\ln\frac{d}{d_0}}{2\pi\lambda_0 l},$$

where $d_0$ is the diameter of the thermosyphon, and l is the depth of the pre-buried hole.

In a preferred embodiment of the invention, the initial thermal conductivity $\lambda_0$ of the pre-buried hole is calculated by using Equation $\lambda_0 = \lambda_\alpha{}^\varepsilon \cdot \lambda_S{}^{(1-\varepsilon)}$, where $\lambda_\alpha$ is the thermal conductivity of air, $\lambda_s$ is the thermal conductivity of the medium within the hole, and e is the porosity.

In a preferred embodiment of the invention, the thermal resistance $R_h$ of the cold conductivity enhancement mass is calculated by using Equation $$R_0 = \frac{\ln\frac{d}{d_0}}{2\pi\lambda_h l},$$

where $d_0$ is the diameter of the thermosyphon, $\lambda_h$ is the thermal conductivity of the cold conductivity enhancement mass, and l is the length of the buried section of the thermosyphon.

In a preferred embodiment of the invention, the cold conductivity enhancement medium is a slurry.

In a preferred embodiment of the invention, the cold conductivity enhancement medium comprises, but is not limited to, a cement paste and/or a geopolymer.

In a preferred embodiment of the invention, the cold conductivity enhancement medium satisfies a permeability coefficient of less than $1\times10^{-4}$ cm/s, a thermal conductivity coefficient of greater than 1.7 W/(m-K), a condensation time of less than 390 min, and a 7-day heat release of less than or equal to 231 J/g.

Another aspect of the invention provides a method of cold conductivity enhancement for thermosyphon foundation, which comprises the steps of step S100: calculating the cold conductivity enhancement coefficient K using the method of calculating cold conductivity enhancement coefficient;

step S200: determining the cold conductivity enhancement coefficient K, if K is greater than or equal to 1, executing step S300, and if K is less than 1, replacing the cold conductivity enhancement medium and returning to step S100;

step S300: drilling pre-buried holes in the foundation;

step S400: injecting a cold conductivity enhancement medium into the pre-buried hole and then inserting the thermosyphon; and step S600: forming the cold conductivity enhancement medium into the cold conductivity enhancement mass.

Yet another aspect of the invention provides a thermosyphon foundation, which comprises:

a foundation provided with pre-buried holes,
a thermosyphon having a buried section buried in the pre-buried hole, and
a cold conductivity enhancement medium;
wherein the cold conductivity enhancement medium is a slurry, the cold conductivity enhancement medium is capable of filling the pre-buried hole to form a cold conductivity enhancement mass, and the cold conductivity enhancement mass fills the gap formed between the thermosyphon and the pre-buried hole after the pipe is buried in the pre-buried hole.

BRIEF DESCRIPTION OF THE DRAWINGS

The following drawings are provided for illustrative purposes only and merely depict exemplary embodiments of the disclosure. These drawings are provided to facilitate the reader's understanding of the disclosure and should not be considered as limiting to the breadth, scope, or applicability of the disclosure. It should be noted that these drawings are not necessarily drawn to scale for clarity and ease of illustration.

DETAILED DESCRIPTION OF THE EXEMPLARY EMBODIMENT

The invention will be described in more detail below with reference to the accompanying drawings and examples to make the objects, technical solutions and advantages of the invention clearer and more intelligible. The specific embodiments described herein are merely illustrative of the invention and should not be construed as limitations of the invention.

thermosyphons have become an important means of thermal protection for the foundation in permafrost areas, but there are still the following problems to be solved: 1) backfilling the drilling hole with coarse sand cannot be effectively compacted, resulting in poor contact between the thermosyphon and the foundation and reducing the cold-conducting efficiency of the thermosyphon; 2) coarse sand as the backfill material is relatively loose, which easily allows atmospheric rainfall to infiltrate and accelerate the degradation of the permafrost foundation, and further causes various kinds of thermal thawing damage to occur and develop on the thermosyphon foundation; 3) at present, no appropriate method is available for evaluating the cold conductivity enhancement effect of post-construction backfilling of the thermosyphon foundation, while the accuracy of empirical determination is not high enough to provide a scientific basis for quantifying the operating efficiency of the thermosyphon. In addition, the two above-mentioned specifications only provide a method for calculating the cooling capacity power of thermosyphons, and there is no method for calculating the degree of cold conductivity enhancement of the thermosyphon foundation. Therefore, determining the degree of cold conductivity enhancement is mainly based on previous engineering experience, which has much uncertainty and easily leads to a wrong determination result.

In view of this situation, the technical solutions of the invention have been developed. These are described in detail below with reference to FIGS. 1 to 3.

Figure 1:
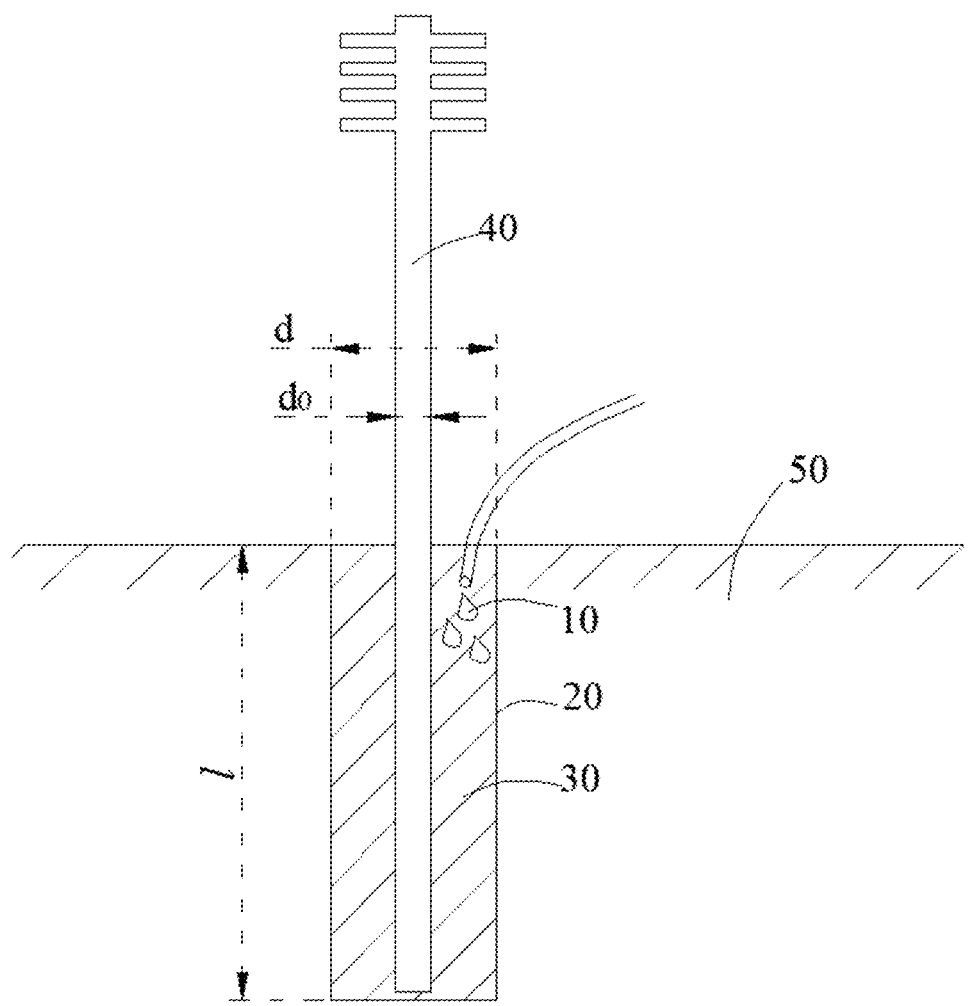
FIG. 1 is a structural diagram of the thermosyphon foundation according to the invention.

An embodiment of the invention provides a method of calculating cold conductivity enhancement coefficient for thermosyphon foundation. The thermosyphon foundation is shown in FIG. 1, wherein foundation 50 is typically a foundation in permafrost areas, and pre-buried holes 20 are drilled in foundation 50. The pre-buried hole 20 is inserted with a thermosyphon 40 and filled with a cold conductivity enhancement medium 10, the cold conductivity enhancement medium 10 forming a cold conductivity enhancement mass 30 in the pre-buried hole 20. The thermosyphon 40 is a heat-transferring element capable of rapidly transferring heat from the permafrost foundation to the outside of the foundation or to the atmosphere by fully utilizing the principle of heat conduction and the fast heat-transferring property of a phase transition medium.

Figure 2:
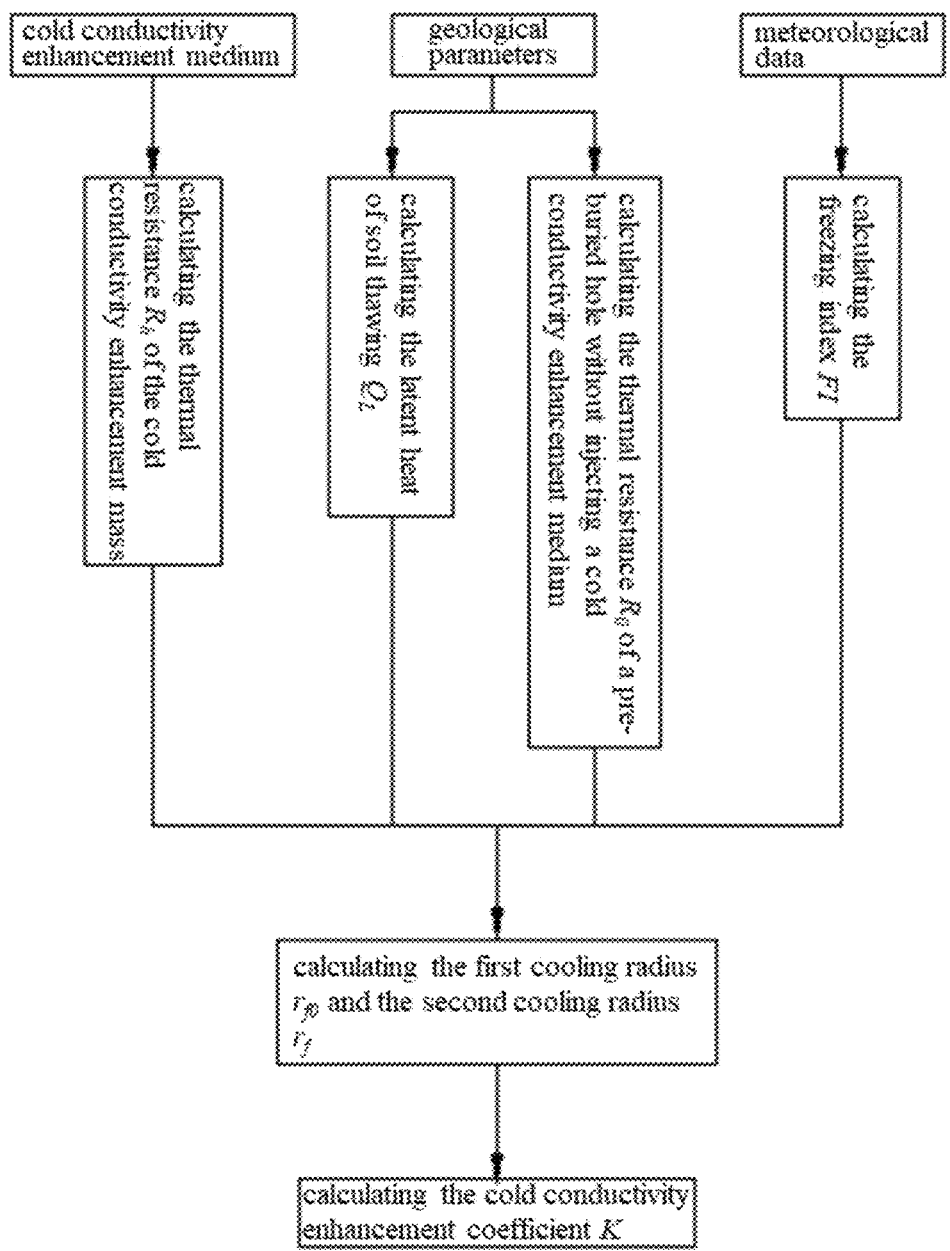
FIG. 2 is a flowchart of the method of calculating cold conductivity enhancement coefficient for thermosyphon foundation according to the invention.

Specifically, the calculation method is shown in FIG. 2, which comprises the following steps.

The freezing index FI is calculated based on meteorological data. The freezing index FI is an important parameter that indicates the degree of coldness of an area in winter. Generally, the freezing index is obtained by summing up the temperature values for days during which the average daily temperature or the average surface temperature is lower than 0° C.

The latent heat of soil thawing $Q_L$ is calculated based on geological parameters, and the thermal resistance $R_0$ of pre-buried hole 20 without injection of the cold conductivity enhancement medium 10 is calculated, wherein the cold conductivity enhancement medium 10 is used for filling the pre-buried hole 20 to form the cold conductivity enhancement mass 30, as well as for filling the gap formed between the thermosyphon 40 and the pre-buried hole 20.

The thermal resistance $R_h$ of cold conductivity enhancement mass 30 is calculated based on the cold conductivity enhancement medium 10.

The cooling radius $r_{f0}$ of thermosyphon 40 without injection of the cold conductivity enhancement medium 10 is calculated by using Equation $$FI = Q_L \cdot \left[ \pi L(R_a + R_0) \cdot \left( r_{f0}^2 - \left(\frac{d}{2}\right)^2 \right) + \frac{r_{f0}^2}{4\lambda} \cdot \left( \ln\frac{2r_{f0}}{d} - 1 \right) + \frac{d^2}{16\lambda} \right],$$

and the cooling radius $r_f$ of thermosyphon 40 after injection of the cold conductivity enhancement medium 10 is calculated by using Equation $$FI = Q_L \cdot \left[ \pi L(R_a + R_h) \cdot \left( r_f^2 - \left(\frac{d}{2}\right)^2 \right) + \frac{r_f^2}{4\lambda} \cdot \left( \ln\frac{2r_f}{d} - 1 \right) + \frac{d^2}{16\lambda} \right],$$

where $R_a$ is the thermal resistance of the thermosyphon 40, $R_h$ is the thermal resistance of the cold conductivity enhancement mass 30, d is the diameter of the pre-buried hole 20, is the thermal conductivity coefficient of the soil, and L is the latent heat of phase transition, specifically, it can be the latent heat of phase transition between ice and water, i.e., L is 334 kJ/kg.

Finally, the cold conductivity enhancement coefficient K is calculated by using Equation $$K = \frac{r_f}{r_{f0}}.$$

In the present invention, pre-buried holes 20 are drilled in the foundation 50 to be filled with the cold conductivity enhancement medium 10 and the thermosyphon 40, and then the cold conductivity enhancement medium 10 is condensed into the cold conductivity enhancement mass 30. As a result, the heat of the foundation 50 is transmitted along with the cold conductivity enhancement mass 30, the thermosyphon 40 in turn, and enters the atmospheric environment, while the coldness of the atmospheric environment is transmitted along with the thermosyphon 40, the cold conductivity enhancement mass 30 in turn, and enters the foundation 50, so that the heat of the foundation 50 is continuously transmitted out while the coldness is gained, and the temperature of the foundation 50 is continuously lowered, thereby achieving the effects of efficiently lowering the ground temperature and preventing thermal thawing settlement of the foundation in permafrost areas.

For the invention, the cold conductivity enhancement coefficient K is a basis for determining the degree of cold conductivity enhancement of the thermosyphon foundation. The larger the cold conductivity enhancement coefficient K, the larger the degree of change in the cooling radius of the thermosyphon before and after injecting the cold conductivity enhancement medium 10, as well as the larger the degree of cold conductivity enhancement, and vice versa. Thus, by calculating the cold conductivity enhancement coefficient K and quantitatively determining the degree of cold conductivity enhancement of the thermosyphon foundation, uncertainties in the empirical method can be prevented and the accuracy of the determination results can be improved. This will provide a scientific basis for quantifying the working efficiency of thermosyphons at a later stage, and can be widely used in various projects of applying thermosyphons in permafrost areas, such as highway project, railway project, electric power project, oil and gas pipeline project.

According to an embodiment of the invention, the freezing index FI can be interpreted as a function of temperature. Accordingly, the meteorological data may include temperature, and the freezing index FI is calculated by using Equation $$FI = \int_{t1}^{t2} |T| dt,$$

where t is time, T is temperature, and T is less than 0° C. At this point, Equation $$FI = \int_{t1}^{t2} |T| dt$$

becomes the sum of the product of the duration of temperatures continuously below 0° C. and its numerical value over a time period of $t_1$-$t_2$, for example, over a year or a whole winter period, and is expressed in degrees days (° C. day) or degrees months (° C. month).

According to an embodiment of the invention, the geological parameters may include the dry density of soil $p_d$ and the water content w. The latent heat of soil thawing $Q_L$ is calculated by using Equation $Q_L = L \cdot p_d \cdot w$. The latent heat of soil thawing refers to the heat absorbed by the soil of foundation 50, in which pre-buried holes 20 are drilled, as it changes from a solid state to a liquid state after being heated to the thawing point. Here, the liquid state refers to a state in which the frozen soil of foundation 50 has changed from a frozen state to a thawed state, i.e., ice in the soil of foundation 50 has changed to water.

According to an embodiment of the invention, the geological parameters may include the initial thermal conductivity $\lambda_0$ of the pre-buried hole 20. The thermal resistance $R_0$ of the pre-buried hole 20 without injection of the cold conductivity enhancement medium 10 is calculated by using Equation $$R_0 = \frac{\ln \frac{d}{d_0}}{2\pi \lambda_0 l},$$

where do is the diameter of the thermosyphon 40 and l is the depth of the pre-buried hole 20.

According to an embodiment of the invention, the initial thermal conductivity $\lambda_0$ of the pre-buried hole 20 is calculated by using Equation $\lambda_0 = \lambda_a \cdot \lambda_s^{(1-\varepsilon)}$, where $\lambda_a$ is the thermal conductivity of air, $\lambda_s$ is the thermal conductivity of the medium within the hole, and e is the porosity. The thermal conductivity $\lambda_s$ of the medium within the hole can be construed as the thermal conductivity of the soil or coarse sand filled in the pre-buried hole 20, while the thermal conductivity of air a is the thermal conductivity of the air in the pre-buried hole 20. Accordingly, the initial thermal conductivity $\lambda_0$ of the pre-buried hole 20 that is obtained from the calculation is much more accurate and will not be distorted.

According to an embodiment of the invention, the thermal resistance $R_h$ of the cold conductivity enhancement mass 30 is calculated by using Equation $$R_0 = \frac{\ln \frac{d}{d_0}}{2\pi \lambda_h l},$$

where $\lambda_h$ is the thermal conductivity of the cold conductivity enhancement mass 30.

In the present invention, the cold conductivity enhancement medium 10 may be coarse sand or the like. However, the cold conductivity enhancement medium 10 is selected to be a slurry in the present invention. Thus, the first aspect is that the gap around the thermosyphon 40 can be sealed by the cold conductivity enhancement mass 30 formed by the slurry so as to strengthen the contact between the thermosyphon 40 and the foundation 50 and to improve the cold-conducting and heat-conducting capabilities of the thermosyphon 40, in particular, to improve the cold-conducting capability of the thermosyphon 40; the second aspect is that the problems such as the backfill material having a large porosity ratio and the impossibility of compacting due to the selection of coarse sand or the like are solved; the third aspect is that the slurry is capable of preventing external water seepage, slowing down the degradation of the foundation 50, improving the thermal stability of the project, and preventing the occurrence and development of various thermal thawing damages on the thermosyphon foundation.

In the present invention, the cold conductivity enhancement medium 10 may include, but is not limited to, a cement paste and/or a geopolymer, and the geopolymer may be slag-based or metakaolin-based or the like. For example, when a cement slurry is selected as the cold conductivity enhancement medium 10, the cement paste used as the cold conductivity enhancement medium 10, after being filled into the pre-buried hole 20, will gradually dry up and solidify after a certain time due to the condensation effect, thereby forming the cold conductivity enhancement mass 30.

Furthermore, in the present invention, the cold conductivity enhancement medium 10 satisfies a permeability coefficient of less than $1 \times 10^{-1}$ cm/s, a thermal conductivity coefficient of greater than 1.7 W/(m-K), a condensation time of less than 390 min, and a 7-day heat release of less than or equal to 231 J/g, so that the cold conductivity enhancement medium 10 has the properties of low permeability, high thermal conductivity, fast condensation, low heat release, etc., and enables the thermosyphon 40 to directly increase the refrigerating power, cooling radius, etc., which effectively saves the project investment and is green and environmentally friendly, as it relies solely on the external natural cold energy without any additional increase in energy.

Figure 3:
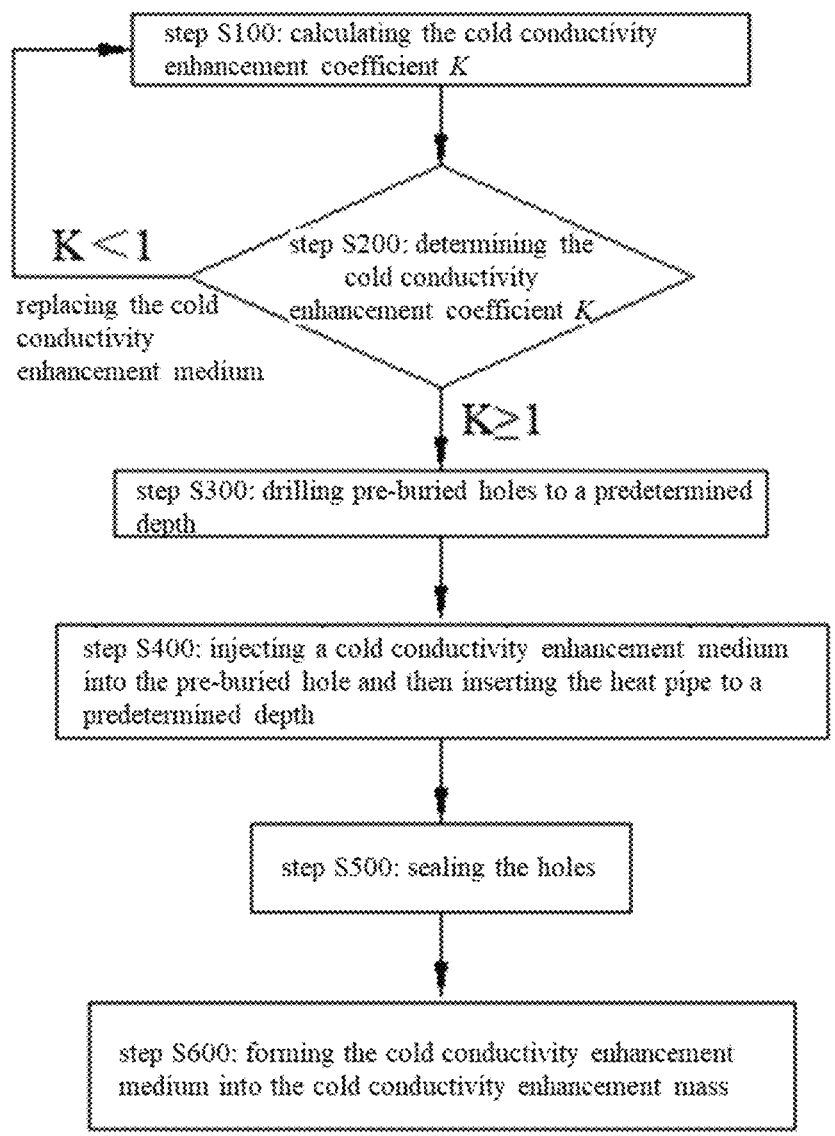
FIG. 3 is a flowchart of the method of cold conductivity enhancement for thermosyphon foundation according to the invention.

As shown in FIGS. 1 and 3, a further embodiment of the invention provides a method of cold conductivity enhancement for thermosyphon foundation, which comprises the following steps S100-S600.

In step S100, the cold conductivity enhancement coefficient K corresponding to the selected cold conductivity enhancement medium 10 is calculated by using the above method of calculating cold conductivity enhancement coefficient.

In step S200, the cold conductivity enhancement coefficient K is determined, if K is greater than or equal to 1, step S300 is executed, and if K is less than 1, the cold conductivity enhancement medium 10 is replaced and returned to S100.

In step S300, pre-buried holes 20 are drilled at the foundation 50 to a predetermined depth. Here, the predetermined depth is the depth l of the pre-buried hole 20, and in the case of permafrost areas, the predetermined depth can be from 8 m to 9 m.

In step S400, pre-buried holes 20 are filled with the cold conductivity enhancement medium 10, and the thermosyphon 40 is inserted.

In step S600, the cold conductivity enhancement medium 10 is used to form the cold conductivity enhancement mass 30. In the case of a cement paste, the cement paste used as the cold conductivity enhancement medium 10 will dry up gradually and solidify after a certain time due to the condensation effect, thereby forming the cold conductivity enhancement mass 30 that does not flow and does not arbitrarily change its shape.

In this embodiment, once the degree of cold conductivity enhancement is determined to meet the requirements, the specific cold conductivity enhancement medium 10 is then injected. As a result, the cold-conducting capacity of the thermosyphon 40 can be improved, especially when the cold conductivity enhancement medium 10 is a slurry, and the contact between the thermosyphon 40 and the foundation 50 can be strengthened, so that the cold-conducting capacity of the thermosyphon 40 can be optimized to ensure the working efficiency of thermosyphons in the operation period.

According to an embodiment of the invention, the construction time of the thermosyphon foundation may be selected in winter to better transfer the coldness in the atmospheric environment to the foundation 50 via the thermosyphon 40 and the cold conductivity enhancement mass 30, and to better realize the cold-conducting capacity of the thermosyphon 40.

According to an embodiment of the invention, in step S400, the thermosyphon 40 may be inserted to a predetermined depth, i.e., the depth l of the pre-buried hole 20. Since the coolness is mainly transferred from the bottom of the thermosyphon 40 to the foundation 50, deeper insertion of the thermosyphon 40 allows more portions of the thermosyphon 40 to be accommodated in pre-buried holes 20, thereby achieving a better cold-conducting effect.

According to an embodiment of the invention, the construction method further comprises a step S500 of sealing the holes. Specifically, the cold conductivity enhancement medium 10 is smoothed at the opening position of the pre-buried hole 20, and the cold conductivity enhancement medium 10 is kept flush with the surface of the foundation 50 to prevent the cold conductivity enhancement medium 10 from seeping out.

According to an embodiment of the invention, the construction method can be categorized into two types, i.e., a pre-grouting construction method and a post-grouting construction method. Specifically, in the pre-grouting construction method, the step S400 comprises the steps of
step S410: injecting the cold conductivity enhancement medium 10 into the pre-buried hole 20; and
step S420: inserting the thermosyphon 40 into the pre-buried hole 20 to a predetermined depth.

That is, the pre-grouting construction method is carried out in a way that the cold conductivity enhancement medium 10 is injected followed by insertion of the thermosyphon 40.

In contrast, in the post-grouting construction method, the step S400 comprises the steps of
step S430: inserting the thermosyphon 40 into the pre-buried hole 20 to a predetermined depth, and ensuring the centerlines of both the thermosyphon 40 and the pre-buried hole 20 to be overlapped; and
step S440: injecting the cold conductivity enhancement medium 10 between the thermosyphon 40 and the pre-buried hole 20.

That is, the post-grouting construction method is carried out in a way that the thermosyphon 40 is inserted followed by injection of the cold conductivity enhancement medium 10.

As shown in FIG. 1, yet another embodiment of the invention provides a thermosyphon foundation, wherein the thermosyphon foundation adopts the above calculation method to calculate the cold conductivity enhancement coefficient K, as well as the above method of cold conductivity enhancement to achieve the cold conductivity enhancement.

Specifically, the thermosyphon foundation comprises foundation 50, thermosyphons 40 and cold conductivity enhancement medium 10. The foundation 50 is provided with pre-buried holes 20, and a buried section of the thermosyphon 40 is buried in the pre-buried hole 20. For example, a buried section of the thermosyphon 40 is buried in the pre-buried hole 20, and a protruding section of the thermosyphon 40 extends out of the pre-buried hole 20. The cold conductivity enhancement medium 10 is a slurry capable of filling the pre-buried hole 20 to form a cold conductivity enhancement mass 30. The cold conductivity enhancement mass 30 fills the gap formed between the thermosyphon 40 and the pre-buried hole 20.

The cold conductivity enhancement medium 10 forms the cold conductivity enhancement mass 30 under the condensation effect. In the operation process, coldness in the atmospheric environment can be introduced into the side of the thermosyphon 40 buried in the pre-buried hole 20 via the side of the thermosyphon 40 extending out of the pre-buried hole 20 and then introduced to the foundation 50 via the cold conductivity enhancement mass 30. On the other hand, heat in the foundation 50 can be introduced to the atmospheric environment sequentially via the cold conductivity enhancement mass 30, the side of the thermosyphon 40 buried in the pre-buried hole 20, and the side of the thermosyphon 40 extending out of the pre-buried hole 20.

Therefore, in the first aspect, the gap around the thermosyphon 40 can be sealed by the cold conductivity enhancement mass 30 formed by a slurry so as to strengthen the contact between the thermosyphon 40 and the foundation 50 and to improve the cold-conducting and heat-conducting capabilities of the thermosyphon 40, in particular to improve the cold-conducting capability of the thermosyphon 40; in the second aspect, the problems such as the backfill material having a large porosity ratio and the impossibility of compacting due to the selection of coarse sand or the like are solved; in the third aspect, the cold conductivity enhancement mass 30 formed by the slurry is capable of preventing external water seepage, slowing down the degradation of the foundation 50, improving the thermal stability of the project, and preventing the occurrence and development of various thermal thawing damages on the thermosyphon foundation.

All the above are only some of the preferred embodiments of the invention and are not intended to limit the invention. The invention may also have a variety of other embodiments, and without departing from the spirit and substance of the invention, a person skilled in the art may make various changes and modifications in accordance with the invention, but such changes and modifications shall fall within the protection scope of the invention.

What is claimed is:

1. A method of cold conductivity enhancement for thermosyphon foundation, comprising the steps of drilling a pre-buried hole in the foundation:

injecting a cold conductivity enhancement medium with a cold conductivity enhancement coefficient K>1 into the pre-buried hole and then inserting a thermosyphon into the pre-buried hole, or inserting the thermosyphon into the pre-buried hole and then injecting the cold conductivity enhancement medium with the cold conductivity enhancement coefficient K>1 between the thermosyphon and the pre-buried hole; and forming the cold conductivity enhancement medium into a cold conductivity enhancement mass and filling a gap formed between the thermosyphon and the pre-buried hole;

calculating the freezing index Fl based on meteorological data;

based on geological parameters, calculating the latent heat of soil thawing $Q_L$ by using Equation $Q_L = L \cdot p_d \cdot w$, and calculating the thermal resistance $R_0$ of a pre-buried hole without injecting a cold conductivity enhancement medium by using Equation $$R_0 = \frac{\ln \frac{d}{d_0}}{2\pi \lambda_0 l},$$

wherein the cold conductivity enhancement medium is used for filling the pre-buried hole to form a cold conductivity enhancement mass, as well as for filling the gap formed between the thermosyphon and the pre-buried hole, the geological parameters include the dry density of soil pa, the water content w and the initial thermal conductivity $\lambda_0$ of the pre-buried hole, where L is the latent heat of phase transition, d is the diameter of the pre-buried hole, do is the diameter of the thermosyphon, and I is the depth of the pre-buried hole;

calculating the initial thermal conductivity $\lambda_0$ of the pre-buried hole by using Equation $\lambda_0 = \lambda_\alpha^\varepsilon \cdot \lambda_s^{(1-\varepsilon)}$, where $\lambda_a$ is the thermal conductivity of air, $\lambda_s$ is the thermal conductivity of the medium within the hole, and $\varepsilon$ is the porosity;

based on the cold conductivity enhancement medium, calculating the thermal resistance $R_h$ of the cold conductivity enhancement mass by using Equation $$R_h = \frac{\ln \frac{d}{d_0}}{2\pi \lambda_h l},$$

where $\lambda_h$ is the thermal conductivity of the cold conductivity enhancement mass;

calculating the cooling radius $r_{f0}$ of the thermosyphon without injection of the cold conductivity enhancement medium by using Equation $$FI = Q_L \cdot \left[ \pi L (R_a + R_0) \cdot \left( r_{f0}^2 - \left(\frac{d}{2}\right)^2 \right) + \frac{r_{f0}^2}{4\lambda} \cdot \left( \ln \frac{2r_{f0}}{d} - 1 \right) + \frac{d^2}{16\lambda} \right]$$

and calculating the cooling radius $r_f$ of the thermosyphon after injection of the cold conductivity enhancement medium by using Equation $$FI = Q_L \cdot \left[ \pi L (R_a + R_h) \cdot \left( r_f^2 - \left(\frac{d}{2}\right)^2 \right) + \frac{r_f^2}{4\lambda} \cdot \left( \ln \frac{2r_f}{d} - 1 \right) + \frac{d^2}{16\lambda} \right],$$

where $R_a$ is the thermal resistance of the thermosyphon, $\lambda$ is the thermal conductivity coefficient of soil, $R_h$ is the thermal resistance of the cold conductivity enhancement mass; and calculating the cold conductivity enhance coefficient K by using Equation $K = r_f / r_{f0}$.

2. The method according to claim 1, wherein the cold conductivity enhancement medium is a slurry.

3. The method according to claim 1, wherein the cold conductivity enhancement medium comprises at least one of a cement paste and a geopolymer.

4. The method according to claim 1, wherein the cold conductivity enhancement medium satisfies a permeability coefficient of less than $1 \times 10^{-4}$ cm/s, a thermal conductivity coefficient of greater than 1.7 W/(m·K), a condensation time of less than 390 min, and a 7-day heat release of less than or equal to 231 J/g.

* * * * *